(12) United States Patent
Tsuji et al.

(10) Patent No.: US 10,010,963 B2
(45) Date of Patent: Jul. 3, 2018

(54) HEAT EXCHANGER AND PRODUCTION METHOD THEREOF

(71) Applicant: NORITZ CORPORATION, Hyogo (JP)

(72) Inventors: Yuta Tsuji, Kobe (JP); Hideyuki Fujisawa, Kobe (JP); Kazuyuki Goto, Kobe (JP); Masato Yoshida, Kobe (JP); Yoshinobu Shinozaki, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 708 days.

(21) Appl. No.: 14/560,298

(22) Filed: Dec. 4, 2014

(65) Prior Publication Data

US 2015/0176912 A1 Jun. 25, 2015

(30) Foreign Application Priority Data

Dec. 25, 2013 (JP) ................. 2013-267842

(51) Int. Cl.
| | |
|---|---|
| *F28F 9/02* | (2006.01) |
| *B23K 9/16* | (2006.01) |
| *B23P 15/26* | (2006.01) |
| *F28D 7/04* | (2006.01) |
| *F28D 21/00* | (2006.01) |
| *B23K 9/167* | (2006.01) |

(Continued)

(52) U.S. Cl.
CPC ............... *B23K 9/16* (2013.01); *B23K 9/167* (2013.01); *B23K 33/006* (2013.01); *B23P 15/26* (2013.01); *F28D 7/04* (2013.01); *F28D 21/0007* (2013.01); *F28F 9/0248* (2013.01); *B23K 2201/14* (2013.01); *F28F 2275/06* (2013.01); *Y10T 29/4935* (2015.01)

(58) Field of Classification Search
CPC .... F28F 9/0219; F28F 9/0248; F28F 2275/06; F28D 1/05316; F28D 21/0007; F28D 7/04; B23K 9/16; B23P 15/26; Y10T 29/4935
See application file for complete search history.

(56) References Cited

U.S. PATENT DOCUMENTS

| | | | | |
|---|---|---|---|---|
| 2003/0010479 | A1* | 1/2003 | Hayashi | ................ F01N 5/02 165/157 |
| 2006/0005955 | A1* | 1/2006 | Orr | .................... F28D 7/024 165/108 |
| 2013/0264037 | A1* | 10/2013 | Otsubo | ............... F28D 7/085 165/157 |

FOREIGN PATENT DOCUMENTS

| | | | |
|---|---|---|---|
| JP | 2009-162461 A | 7/2009 | |
| JP | 4386491 B2 * | 12/2009 | ............... F28D 7/16 |

(Continued)

*Primary Examiner* — Tho V Duong
(74) *Attorney, Agent, or Firm* — Studebaker & Brackett PC

(57) ABSTRACT

The heat exchanger wherein each end of a plurality of heat transfer tubes is connected to an end wall of a bulging portion provided at a side wall of a case, an open edge of a header is fitted onto the bulging portion, and a chamber connecting with each heat transfer tube is formed. For jointing the header to the side wall, an inner circumferential end of the open edge of the header is formed as a first curved surface with a convex section, an outer face of the circumferential wall of the bulging portion is formed as a second curved surface with a concave section, the first curved surface and the second curved surface contact each other, and the surface-contact portion and the area therearound are welded. The number of the members is reduced, the structure is simplified, and the production cost of the heat exchanger is reduced.

9 Claims, 4 Drawing Sheets

(51) Int. Cl.
*B23K 33/00* (2006.01)
*B23K 101/14* (2006.01)

(56) References Cited

FOREIGN PATENT DOCUMENTS

JP     2011027363 A * 2/2011
JP     2012-002464 A   1/2012

* cited by examiner

HEAT EXCHANGER AND PRODUCTION METHOD THEREOF

BACKGROUND OF THE INVENTION

Field of the Invention

The present invention relates to a heat exchanger that a plurality of heat transfer tubes are housed in a case and to a production method of the heat exchanger.

Description of the Related Art

The applicant of the present invention has proposed the heat exchanger disclosed in Patent Literature 1 as one example of such a heat exchanger.

The heat exchanger disclosed in Patent Literature 1 is bulged out of a part of the side wall of the case that a plurality of heat transfer tubes are housed inside and the bulging portion constitutes a header for entering water or delivering heated water. A practical means for utilizing the bulging portion as the header is an auxiliary member through which the ends of the heat transfer tubes are designed to penetrate. The auxiliary member is jointed in the bulging portion and separates the inside of the bulging portion from the inside of the case.

In such a configuration, the header is integrally provided with the side wall of the case, thereby being capable of reducing the number of members and downsizing the apparatus. The bulging portion bulges out of the case, thereby avoiding such a disadvantage that arrangement of the heat transfer tube is largely restricted because of a reduced space in the case; for example, unlike the heat exchanger disclosed in Patent Literature 2.

However, there is still a room for improvement in the conventional art as mentioned below.

The auxiliary member is required to be jointed in the bulging portion and the jointing portion is to be positioned in the case. Therefore, it is difficult to use welding as a jointing means of the jointing portion and brazing is required. However, brazing needs large equipment such as a vacuum furnace, thereby increasing the facility cost. As a result, the production cost of the heat exchanger also increases. In addition, when brazing is executed in the case, it is difficult to check whether brazing is appropriately done or not, thereby quality control becomes difficult.

Conventionally, some heat exchangers are capable of being manufactured by welding, unlike Patent Literature 1. However, such a heat exchanger comprises a number of members and has a complicated structure. Therefore, the production cost of such a heat exchanger becomes high.

CITATION LIST

Patent Literature 1: Japanese unexamined patent publication 2012-2464

Patent Literature 2: Japanese unexamined patent publication 2009-162461

SUMMARY OF THE INVENTION

An object of the present invention is to provide a heat exchanger capable of resolving or reducing the above-mentioned disadvantages and to provide a production method of the heat exchanger.

The present invention proposes the following technical means for solving the above-mentioned problems.

A heat exchanger proposed in the first aspect of the present invention comprises a plurality of heat transfer tubes, a case having at least one side wall and housing the heat transfer tubes, and a header for entering water into the heat transfer tubes or delivering heated water from the heat transfer tubes. The side wall of the case is provided with a bulging portion having a cylindrical circumferential wall bulging out of the case and having an end wall which blocks a tip portion of the circumferential wall and is connected with the heat transfer tubes. The header has a hollow main body having an open edge forming an opening corresponding to the bulging portion and the opening of the header is blocked by the end wall by fitting the open edge onto the circumferential wall, thereby a chamber communicating with the heat transfer tubes is formed in the header. For jointing the header to the side wall, an inner circumferential end of the open edge of the header is formed as a first curved surface with a convex section, an outer face of the circumferential wall of the bulging portion is formed as a second curved surface with a concave section, the first curved surface and the second curved surface are in a surface-contact condition, and the surface-contact portion and the area therearound are welded.

Preferably, the side wall of the case is constituted with a metal plate, the bulging portion is integrally formed with the side wall by press-working, and the circumferential wall of the bulging portion and the end wall of the bulging portion are integrally connected.

Preferably, the first curved surface is formed by bending the open edge of the header outward.

Preferably, the second curved surface is formed in a middle portion in the projecting height direction of the circumferential wall of the bulging portion, and the circumferential wall has a base portion without fitting to the open edge of the header, the base portion being positioned closer to a non-bulging portion of the side wall than the second curved surface.

Preferably, the second curved surface is formed in a boundary portion where the circumferential wall of the bulging portion and the non-bulging portion of the side wall intersect and are connected each other.

Preferably, the heat transfer tubes have a plurality of helical tube bodies being arranged to be wound and overlapped in a substantially concentric manner, and have a plurality of straight tube bodies connected with ends of the helical tube bodies, respectively. The ends of the straight tube bodies are connected to the bulging portion.

Preferably, the case has a supply port and a discharge port of heating gas for the heat transfer tubes, and the heating gas in the case from the supply port flows so as to contact the outer surfaces of the heat transfer tubes and reaches the discharge port.

Preferably, a joint tube body communicating with the chamber is configured to project out of an outer surface of the main body of the header.

A production method of the heat exchanger proposed by the second aspect of the preset invention is for producing the heat exchanger proposed in the first aspect of the present invention. The heat exchanger includes a plurality of heat transfer tubes; a side wall of a case, the side wall constituting a part of the case housing the heat transfer tubes and being provided with a bulging portion having a cylindrical circumferential wall bulging out of the case and having an end wall which blocks a tip portion of the circumferential wall; and a hollow header having an open edge forming an opening corresponding to the bulging portion. An inner circumferential end of the open edge of the header is formed as a first curved surface with a convex section, and an outer face of the circumferential wall of the bulging portion is formed as a second curved surface with a concave section, in advance. The method includes a first step of inserting the heat transfer tubes into the end wall of the bulging portion and of welding the heat transfer tubes to the bulging portion, and a second step of fitting the open edge of the header onto the circumferential wall of the bulging portion and jointing the header to the side wall by surface-contact of the first curved surface and the second curved surface and by welding of the surface-contact portion and therearound, after the first step.

Preferably, the second curved surface is formed in a middle portion in the projecting height direction of the circumferential wall in the first step. The circumferential wall has a base portion without fitting to the open edge of the header, the base portion being positioned closer to a non-bulging portion of the side wall than the second curved surface in the second step.

Preferably, the welding is TIG welding.

Other characteristics and advantages of the present invention will be apparent in the following detailed description of the preferred embodiments referring to the attached drawings.

DETAILED DESCRIPTION OF THE PREFERRED EMBODIMENT

Preferred embodiments of the present invention are explained below with reference to the accompanying drawings.

Figure 1:
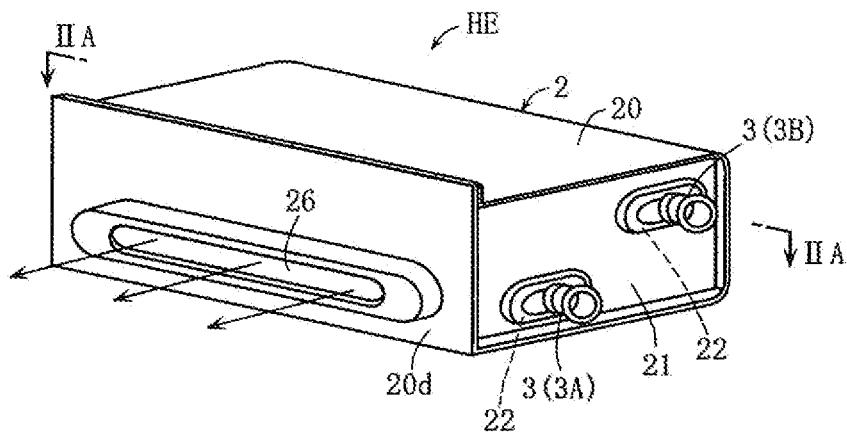
FIG. 1 is an externally perspective view showing one example of a heat exchanger of the present invention.
Figure 2A:
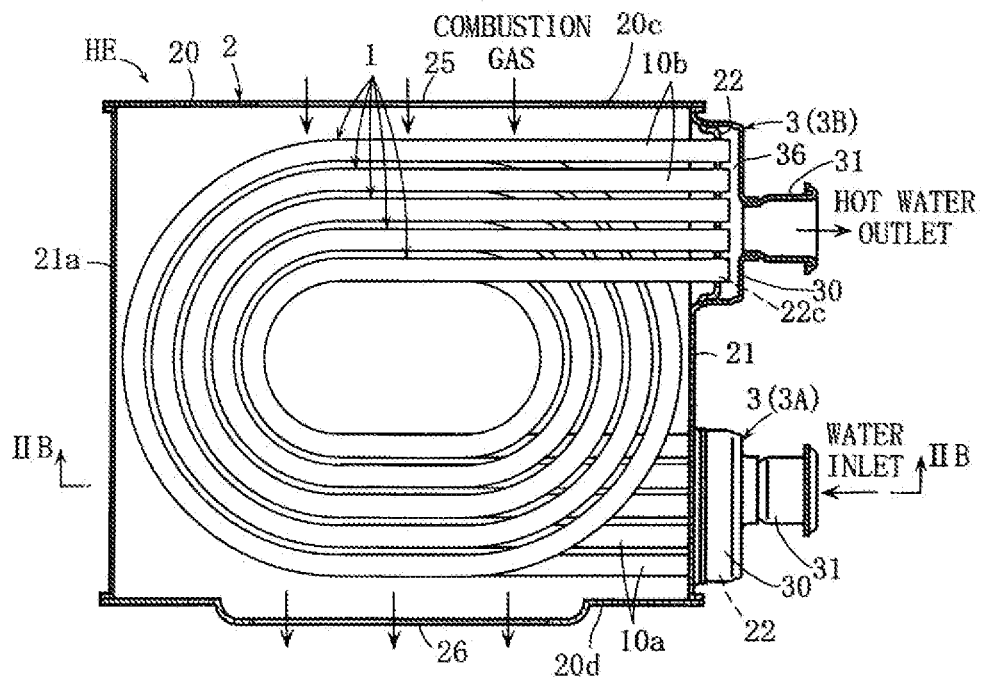
FIG. 2A is a sectional view along the line IIA to IIA in FIG. 1
Figure 2B:
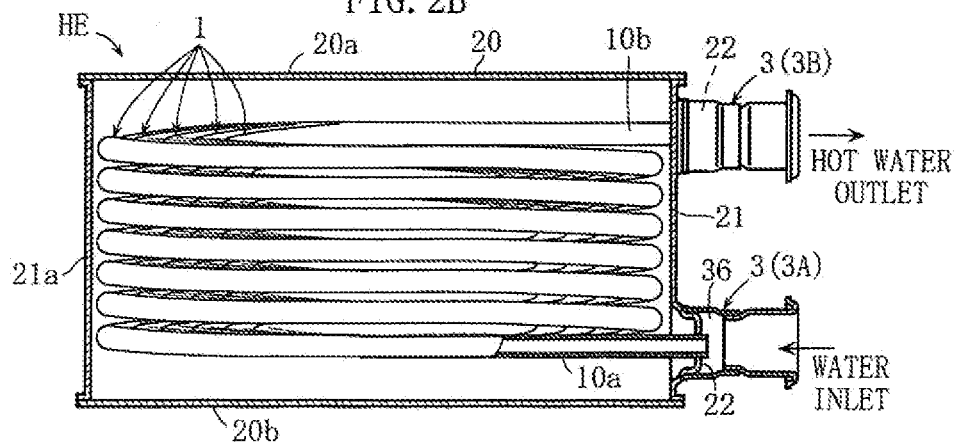
FIG. 2B is a sectional view along the line IIB to IIB in FIG. 2A.

A heat exchanger HE shown in FIG. 1, FIG. 2A and FIG. 2B is preferably used for heating water by recovering heat from combustion gas generated by a burner (not shown in the figure) such as a gas burner or an oil burner and is used, for example, as a heat exchanger provided for a water heater for recovering latent heat.

The heat exchanger HE has a case 2, a plurality of heat transfer tubes 1 housed in the case 2, and a pair of headers 3 (3A, 3B) connected to lower ends and upper ends of the heat transfer tubes 1 for entering water and for delivering heated water, respectively.

A plurality of heat transfer tubes 1 are formed with a plurality of helical tube bodies in the form of an ellipse as seen in plan view. The helical tube bodies have different sizes and are arranged to be wound and overlapped in a substantially concentric manner. Each upper portion and lower portion of the heat transfer tubes 1 constitute straight tube bodies 10a, 10b extending almost horizontally. In FIG. 2B an upper gap and a lower gap of the heat transfer tube 1 in the case 2 are large; however, the gaps are preferably made as narrow as possible. For reducing the gaps, a stepped portion (not shown in the figure) projecting toward the heat transfer tubes 1 can be provided for an upper wall 20a and a lower wall 20b, respectively.

The case 2, like a cuboid, has a main body 20 (rectangle-tubular stem body) and a pair of side walls 21, 21a. The main body 20 and the side walls 21, 21a are constituted with metal plates such as stainless steel. A rear wall 20c and a front wall 20d of the case 2 are provided with an inlet port 25 and an outlet port 26 of combustion gas, respectively. Combustion gas entered in the case 2 from the inlet port 25 passes through gaps between a plurality of heat transfer tubes 1 and reaches the outlet port 26. In the procedure, heat is recovered from combustion gas by each heat transfer tube 1 and water in each heat transfer tube 1 is heated.

Figure 3A:
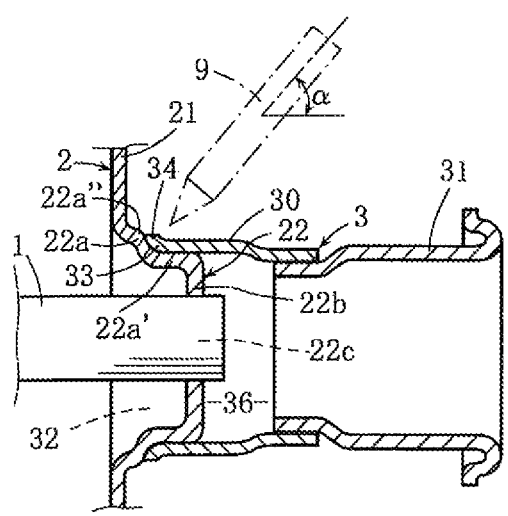
FIG. 3A is an enlarged sectional view of the substantial part of FIG. 2B.
Figure 3B:
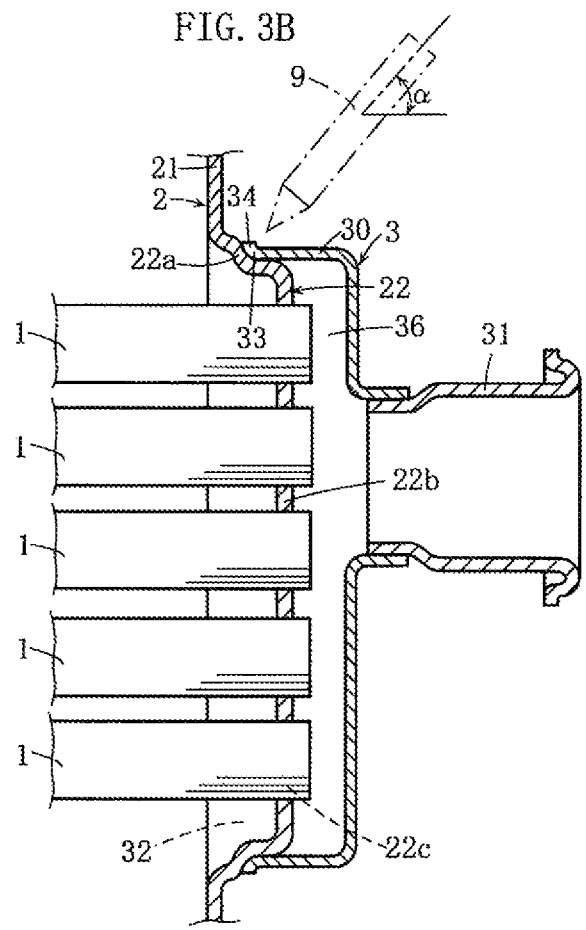
FIG. 3B is a plan sectional view of the substantial part of FIG. 3A.
Figure 3C:
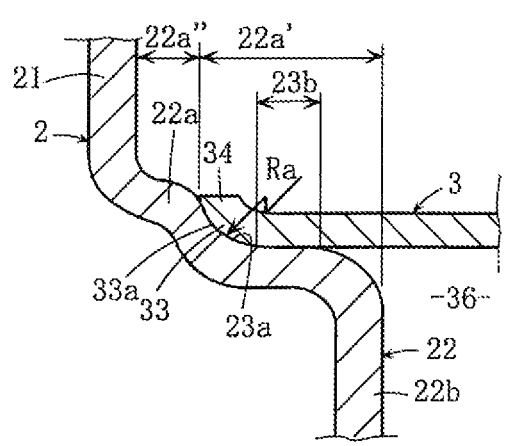
FIG. 3C is an enlarged sectional view of the substantial part of FIG. 3A.

The side wall 21 of the case 2 is formed with two bulging portions 22. Each bulging portion 22 is formed by press-working of the side wall 21. As shown in FIG. 3A to FIG. 3C, each bulging portion 22 has a cylindrical circumferential wall 22a bulging out of the case 2 and an end wall 22b blocking a tip portion of the circumferential wall 22a. A plurality of heat transfer tubes 1 are inserted into a plurality of penetrating holes 22c provided for the end wall 22b, respectively, and are welded to the end wall 22b. When the end of each heat transfer tube 1 is welded while penetrating through the end wall 22b and projecting out of the case 2 (as shown in the figures), the end melts instead of a welding rod and becomes substantially flush with the end wall 22b.

As shown in FIG. 3C, the circumferential wall 22a of the bulging portion 22 has a fitting portion 22a' onto which an open edge 33 to be mentioned later is fitted and has a base portion 22a" positioned closer to a non-bulging portion (a portion of the side wall 21 on which the bulging portion 22 is not formed) of the side wall 21 than the fitting portion 22a'. The fitting portion 22a' has a second curved surface 23a with a convex section and a tubular portion 23b with constant outer diameter, the second surface 23a having predetermined curvature radius Ra for surface-contacting with the first curved surface 33a to be mentioned later.

Figure 4A:
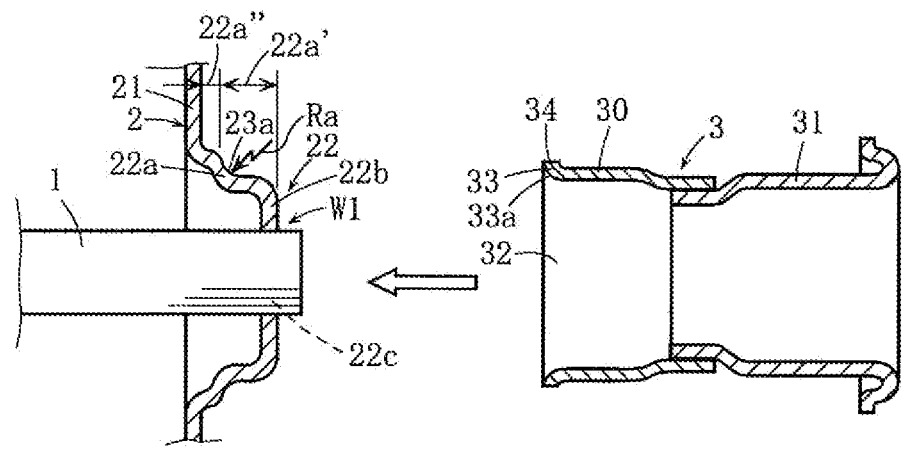
FIG. 4A is an exploded sectional view of the structure shown in FIG. 3A
Figure 4B:
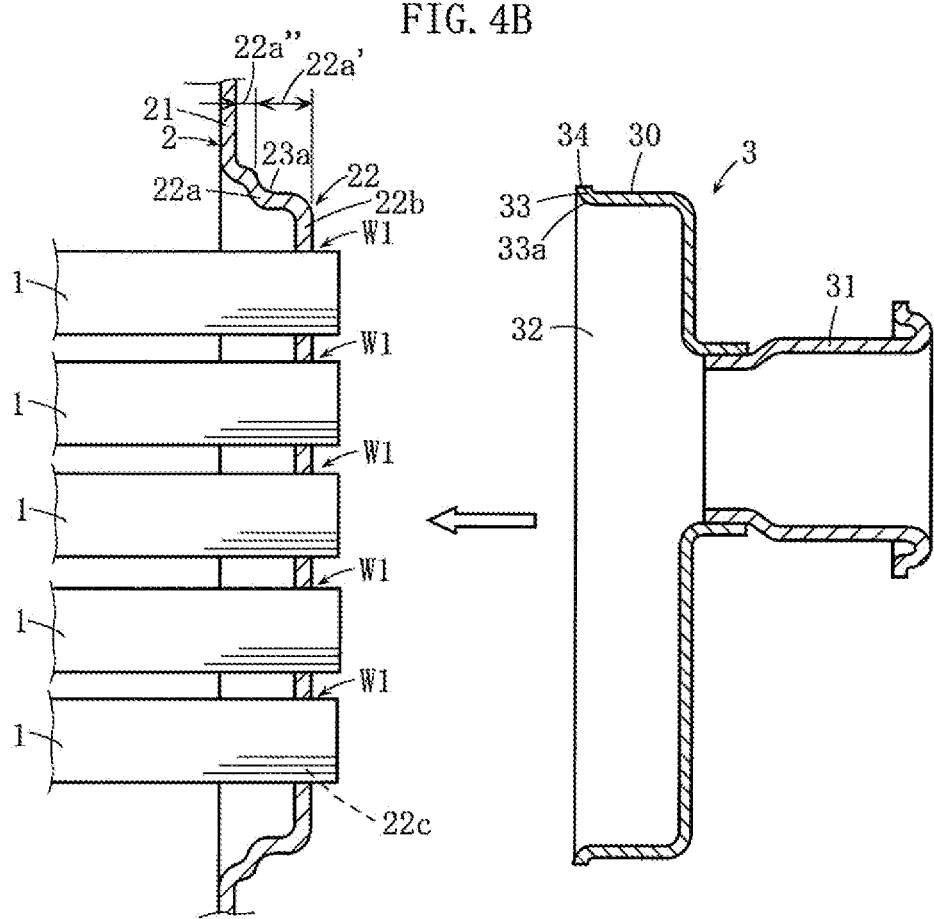
FIG. 4B is an exploded sectional view of the structure shown in FIG. 3B.

The header 3 is constituted with a separate member from the side wall 21. As shown in FIG. 4A and FIG. 4B, the header 3 has a hollow main body 30 having on the front side the open edge 33 forming an opening 32 corresponding to the bulging portion 22, and has a joint tube body 31 connected to the rear side of the main body 30. A flange 34 is integrally formed with the outer circumference of the open edge 33, the flange 34 being short and projecting out of the open edge 33. The first curved surface 33a with a convex section is formed at the inner circumferential end of the open edge 33. The curvature radius of the first curved surface 33a is substantially the same as the curvature radius Ra of the second curved surface 23a.

Figure 3D:
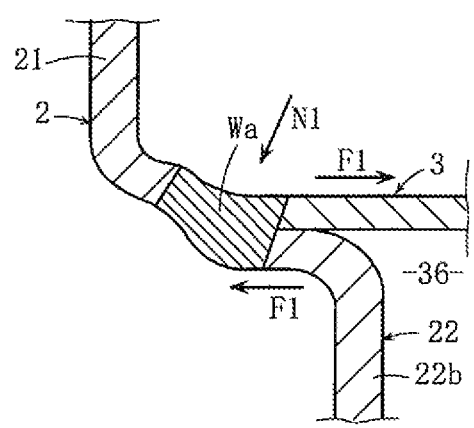
FIG. 3D is an enlarged sectional view showing one example after welding in the structure shown in FIG. 3C.

As shown in FIG. 3A to FIG. 3C, the open edge 33 of the header 3 is fitted onto the fitting portion 22a' of the circumferential wall 22a of the bulging portion 22 in such a manner that the first curved surface 33a and the second curved surface 23a contact in surface each other. Welding is executed on the surface contacting portion and therearound for jointing the header 3 and the side wall 21. The header 3 and the side wall 21 are connected by such a welding via a welded portion Wa as shown in FIG. 3D. The header 3 is connected to the bulging portion 22 and the opening 32 of the header 3 is closed by the end wall 22b of the bulging portion 22. Therefore, an area out of the end wall 22b in the header 3 constitutes a chamber 36 for flowing water communicating in each heat transfer tube 1.

The above-mentioned heat exchanger HE is manufactured, for example, by the following procedures.

A plurality of heat transfer tubes 1, the case 2, and the header 3 as mentioned above are used.

Figure 5A:
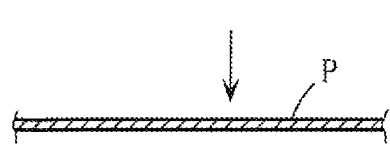
FIG. 5A to FIG. 5C are sectional views diagrammatically showing production procedures of the header of the heat exchanger shown in FIG. 1.
Figure 5B:
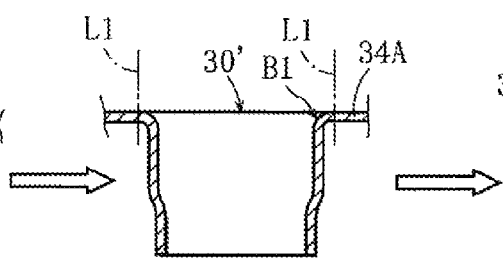
Figure 5C:
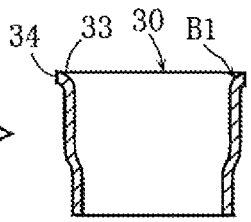

The main body 30 of the header 3 is manufactured, for example, by the procedures shown in FIG. 5A to FIG. 5C. A flat metal plate P being raw material is subjected to deep drawing as shown in FIG. 5A. Then, an intermediate product 30' of a header connected to a flat plate portion 34A is formed as shown in FIG. 5B. Next, the flat plate portion 34A is punched out at a position of a virtual line L1 shown in FIG. 5B. Then, the main body 30 of the header 3 having the short flange 34 is manufactured as shown in FIG. 5C. The header 3 is completed by welding the joint tube body 31 to the main body 30.

For assembling the heat exchanger HE, as shown in FIG. 4A and FIG. 4B, a plurality of heat transfer tubes 1 penetrate through the bulging portion 22 of the side wall 21 of the case 2. Each end of the heat transfer tubes 1 is pulled out of the side wall 21. Then, the entire circumference of each heat transfer tube 1 neighboring the end wall 22b is welded to the end wall 22b. The welding is able to be executed outside the side wall 21 (outside the case 2) as shown with the reference numeral W1. In such a case, the end of the heat transfer tube 1 is able to be utilized as a welding rod as mentioned above.

Next, the open edge 33 of the header 3 is fitted onto the circumferential wall 22a of the bulging portion 22, and the first and the second curved surface 33a, 23a contact in surface each other. Then, as shown in FIG. 3A and FIG. 3B the entire circumference of the open edge 33 is TIG welded to the circumferential wall 22a using, for example, a TIG welding torch 9. This welding is also able to be executed outside the case 2. A series of procedures as mentioned above is able to be executed while the side wall 21 is not jointed to the main body 20 of the case 2. After welding the header 3 to the side wall 21, the side wall 21 is assembled to the side face of the main body 20 in such a manner that a plurality of heat transfer tubes 1 are housed in the main body 20 of the case 2. For assembling, the side wall 21 is fitted to a side opening of the main body 20 and the fitted portion is welded. Of course, unlike such an assembly procedure, after the side wall 21 is assembled to the main body 20, the header 3 can be assembled to the bulging portion 22 of the side wall 21.

The preferred embodiments of the present invention have the following operational effects.

As mentioned above, members are easily jointed by a welding means when the heat exchanger HE is assembled. Therefore, equipment for brazing is not required so that the equipment cost is reduced. Welding is executed outside the case 2, thereby facilitating confirmation operation whether the joint is appropriate or not after welding. On the other hand, the number of the members of the heat exchanger HE is reduced and the entire structure is simplified. The header 3 is assembled to the bulging portion 22 by a fitting method, thereby improving assembly efficiency. Therefore, the production cost of the heat exchanger HE is able to be reduced.

When the header 3 is fitted onto the circumferential wall 22a of the bulging portion 22, the first and the second curved surfaces 33a, 23a contact in surface each other, so that the surfaces generate no or almost no gap therebetween. The first and the second curved surfaces 33a, 23a are formed by press-working, thereby the dimensional accuracy is high. Therefore, it is preferable to clear the gap. If there is a relatively large gap between two members to be welded, there is a fear of poor welding such as dropping at the time of welding. In this embodiment, there is no such fear and the welded portion has good quality and high strength. The flange 34 can be used as a welding rod, so that a thin welded portion Wa is preferably prevented.

The open edge 33 of the header 3 is welded to the middle portion in the projecting height direction of the circumferential wall 22a of the bulging portion 22. The welding direction of the welded portion Wa (connecting direction of the open edge 33 and the circumferential wall 22a) shown in FIG. 3D is or is close to the direction shown with the arrow N1. When a water hammer occurs in the hot-water pipe line (not shown in the figure) connected with the header 3 of the heat exchanger HE and the water pressure in the chamber 36 increases, the header 3 and the bulging portion 22 generate the force F1 shown in FIG. 3D. The welding direction of the welded portion Wa intersects with the direction of the force F1 (the direction of shear force), so that the strength against the force F1 becomes great. Therefore, the heat exchanger HE has superior durability.

The welding of the bulging portion 22 and the header 3 is executed at a position appropriately apart from a non-bulging portion of the side wall 21. Therefore, an inclined angle α of the welding torch 9 is easily made large so as not to cause inappropriate interference between the welding torch 9 and the side wall 21, as shown in FIG. 3A and FIG. 3B. In addition, heat caused by welding is prevented from being transmitted to the non-bulging portion of the side wall 21. Therefore, the side wall 21 is appropriately prevented from generating strain caused by heat of welding.

Figure 6:
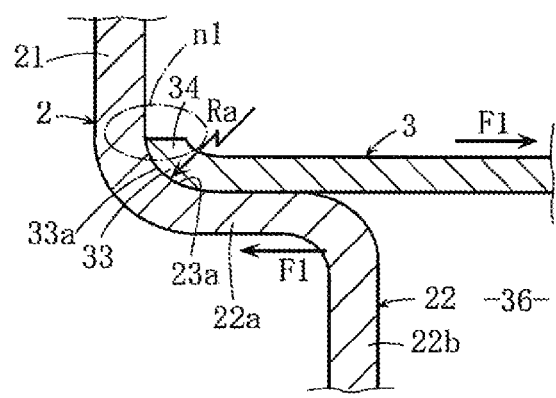
FIG. 6 is a sectional view of the substantial part showing another embodiment of the present invention.

FIG. 6 shows another embodiment of the present invention. In the figure, the same or similar elements in the above-mentioned embodiment are allotted with the same reference numerals.

In the embodiment shown in FIG. 6, the second curved surface 23a is positioned at the closest portion to be the base end of the circumferential wall 22a of the bulging portion 22 and is connected with the outer face of the non-bulging portion of the side wall 21.

In this embodiment, because the base portion 22a" is not provided, unlike the above-mentioned embodiment, the shape of the bulging portion 22 is simplified. Such an embodiment is preferable in view of cost reduction. In this embodiment, a part of the header 3 is welded to the side wall 21 in the area n1 in the figure. The welding direction is substantially the same as the direction of the force F1 generated when the pressure in the chamber 36 increases and the strength to the force F1 may be small. Therefore, in view of improving reliability of welding strength, the above-mentioned structure is preferable, namely welding is executed to the middle portion in the height direction of the circumferential wall 22a of the bulging portion 22. However, welding with enough strength for actual use is able to be executed in this embodiment.

The present invention is not limited to the above-mentioned preferred embodiments. The specific configuration of the members of the heat exchanger of the present invention is freely designed within the intended scope of the present invention. The specific procedure of the production method of the heat exchanger of the present invention is also freely diversified.

The specific bulging dimension of the bulging portion of the present invention is not limited as long as the bulging portion has the cylindrical circumferential wall bulging out of the side wall of the case toward the outside of the case and the end wall blocking the tip portion of the circumferential wall. The heat transfer tube is not limited to use a helical tubular body and can use several kinds of heat transfer tubes (for example, a straight tube, a U-shaped tube, or a meandering flexible tube).

The header 3 can be constituted without the flange 34. For example, the first curved surface can be formed by bending the open edge of the header outwardly, the flange formed at that time can be removed from the header, and the header can be welded to the side wall. In MIG welding, a consumable electrode is used, so that the flange portion is not required to be used as a welding rod, unlike TIG welding.

When a plurality of headers are provided for the heat exchanger in the present invention, it is preferable that all of the headers are configured as intended in the present invention; however, the present invention is not limited to such a configuration. If some of the headers are configured as intended in the present invention and other headers are not configured as intended in the present invention, such a configuration is included in the technical scope of the present invention. An object medium for heat exchange in the case is fluid other than combustion gas. The heat exchanger of the present invention is not limited to be used for recovering latent heat and can be used for several purposes other than water heating.

The invention claimed is:

1. A heat exchanger comprising:
    a plurality of heat transfer tubes;
    a case having at least one side wall and housing the heat transfer tubes; and
    a header for entering water into the heat transfer tubes or delivering heated water from the heat transfer tubes;
    wherein
    the side wall of the case is provided with a bulging portion having a cylindrical circumferential wall bulging out of the case and having an end wall which blocks a tip portion of the circumferential wall and is connected with the heat transfer tubes,
    the header has a hollow main body having an open edge forming an opening corresponding to the bulging portion and the opening of the header is blocked by the end wall by fitting the open edge onto the circumferential wall, thereby a chamber communicating with the heat transfer tubes is formed in the header,
    for jointing the header to the side wall, an inner circumferential end of the open edge of the header is formed as a first curved surface with a convex section, an outer face of the circumferential wall of the bulging portion is formed as a second curved surface with a concave section, the first curved surface and the second curved surface are in a surface-contact condition, and the surface-contact portion and the area therearound are welded,
    the second curved surface is formed in a middle portion in the projecting height direction of the circumferential wall of the bulging portion, and
    the circumferential wall has a base portion without fitting to the open edge of the header, the base portion being positioned closer to a non-bulging portion of the side wall than the second curved surface.

2. The heat exchanger as set forth in claim 1, wherein the side wall of the case is constituted with a metal plate, and
    the bulging portion is integrally formed with the side wall by press-working, and the circumferential wall of the bulging portion and the end wall of the bulging portion are integrally connected.

3. The heat exchanger as set forth in claim 1, wherein the first curved surface is formed by bending the open edge of the header outward.

4. The heat exchanger as set forth in claim 1, wherein the heat transfer tubes have a plurality of helical tube bodies being arranged to be wound and overlapped in a substantially concentric manner, and have a plurality of straight tube bodies connected with ends of the helical tube bodies, respectively, and
    ends of the straight tube bodies are connected to the bulging portion.

5. The heat exchanger as set forth in claim 1, wherein the case has a supply port and a discharge port of heating gas for the heat transfer tubes, and the heating gas in the case from the supply port flows so as to contact the outer surfaces of the heat transfer tubes and reaches the discharge port.

6. The heat exchanger as set forth in claim 1, wherein a joint tube body communicating with the chamber is configured to project out of an outer surface of the main body of the header.

7. A production method of the heat exchanger as set forth in claim 1, wherein the heat exchanger comprises:
    a plurality of heat transfer tubes;
    a side wall of a case, the side wall constituting a part of the case housing the heat transfer tubes and being provided with a bulging portion having a cylindrical circumferential wall bulging out of the case and having an end wall which blocks a tip portion of the circumferential wall; and
    a hollow header having an open edge forming an opening corresponding to the bulging portion,
    wherein
    an inner circumferential end of the open edge of the header is formed as a first curved surface with a convex section, and an outer face of the circumferential wall of the bulging portion is formed as a second curved surface with a concave section, in advance,
    the second curved surface is formed in a middle portion in the projecting height direction of the circumferential wall of the bulging portion, and
    the circumferential wall has a base portion without fitting to the open edge of the header, the base portion being positioned closer to a non-bulging portion of the side wall than the second curved surface,
    the method comprising:
    a first step of inserting the heat transfer tubes into the end wall of the bulging portion and of welding the heat transfer tubes to the bulging portion; and
    a second step of fitting the open edge of the header onto the circumferential wall of the bulging portion and jointing the header to the side wall by surface-contact of the first curved surface and the second curved surface and by welding of the surface-contact portion and therearound, after the first step.

8. The production method as set forth in claim 7, wherein the second curved surface is formed in the middle portion in the projecting height direction of the circumferential wall in the first step, and
    the base portion is positioned closer to the non-bulging portion of the side wall than the second curved surface in the second step.

9. The production method as set forth in claim 7, wherein the welding is TIG welding.

* * * * *